US008660848B1

(12) United States Patent
Humi

(10) Patent No.: US 8,660,848 B1
(45) Date of Patent: Feb. 25, 2014

(54) METHODS AND SYSTEMS FOR DETECTION FROM AND ANALYSIS OF PHYSICAL SIGNALS

(75) Inventor: Mayer Humi, Worcester, MA (US)

(73) Assignee: Worcester Polytechnic Institute, Worcester, MA (US)

(*) Notice: Subject to any disclaimer, the term of this patent is extended or adjusted under 35 U.S.C. 154(b) by 153 days.

(21) Appl. No.: 13/213,824

(22) Filed: Aug. 19, 2011

Related U.S. Application Data

(60) Provisional application No. 61/375,570, filed on Aug. 20, 2010.

(51) Int. Cl.
| | |
|---|---|
| *G10L 21/00* | (2013.01) |
| *G10L 19/00* | (2013.01) |
| *G01V 1/40* | (2006.01) |
| *G01V 3/18* | (2006.01) |
| *G01V 5/04* | (2006.01) |
| *G01V 9/00* | (2006.01) |
| *G01B 3/44* | (2006.01) |
| *G01B 3/52* | (2006.01) |
| *G01R 31/00* | (2006.01) |
| *G01R 15/00* | (2006.01) |
| *G01R 13/00* | (2006.01) |
| *G01R 25/00* | (2006.01) |
| *G01R 23/00* | (2006.01) |
| *G01V 3/00* | (2006.01) |
| *G01V 7/00* | (2006.01) |
| *H03F 1/26* | (2006.01) |
| *H04B 15/00* | (2006.01) |

(52) U.S. Cl.
USPC ............ 704/270; 704/219; 704/500; 702/39; 702/58; 702/130; 702/34; 702/189; 702/190; 702/9; 702/56; 702/57; 702/66; 702/79; 702/199; 702/194; 702/2; 702/3; 702/4; 702/75

(58) Field of Classification Search
USPC ............... 704/270, 219, 500; 702/39, 130, 34, 702/189–190, 9, 56–58, 66, 79, 199, 194, 702/2–4, 75
See application file for complete search history.

(56) References Cited

U.S. PATENT DOCUMENTS

| | | | | |
|---|---|---|---|---|
| 5,983,162 | A * | 11/1999 | Huang | 702/4 |
| 6,311,130 | B1 * | 10/2001 | Huang | 702/2 |
| 6,381,559 | B1 * | 4/2002 | Huang | 702/194 |
| 6,631,325 | B1 * | 10/2003 | Huang et al. | 702/3 |
| 6,738,734 | B1 * | 5/2004 | Huang | 702/194 |
| 6,901,353 | B1 * | 5/2005 | Huang | 702/189 |
| 6,990,436 | B1 * | 1/2006 | Huang | 702/199 |

(Continued)

OTHER PUBLICATIONS

Aicha Bouzid, Noureddine Ellouze, EMD Vocal Tract Frequency Analysis of Speech Signal, 4th International Conference: Sciences of Electronic, Tachnologies of Information and Telecommunications, Mar. 25-29, 2007—Tunisia.*

(Continued)

*Primary Examiner* — Pierre-Louis Desir
*Assistant Examiner* — Anne Thomas-Homescu
(74) *Attorney, Agent, or Firm* — Burns & Levinson LLP; Jacob N. Erlich; Orlando Lopez

(57) ABSTRACT

In the method of these teachings for detection of physical phenomena from or analysis of physical signals, an improved Empirical Mode Decomposition method decomposes physical signals representative of a physical phenomenon into components.

18 Claims, 10 Drawing Sheets

(56) References Cited

U.S. PATENT DOCUMENTS

| | | | |
|---|---|---|---|
| 7,966,156 B1* | 6/2011 | Frei et al. | 702/190 |
| 2002/0186895 A1* | 12/2002 | Gloersen | 382/285 |
| 2003/0033094 A1* | 2/2003 | Huang | 702/39 |
| 2004/0078160 A1* | 4/2004 | Frei et al. | 702/79 |
| 2004/0230387 A1* | 11/2004 | Bechhoefer | 702/58 |
| 2007/0030002 A1* | 2/2007 | Frei et al. | 324/309 |
| 2007/0078611 A1* | 4/2007 | Huang et al. | 702/56 |
| 2008/0021345 A1* | 1/2008 | Kern et al. | 600/554 |
| 2008/0059086 A1* | 3/2008 | Duron et al. | 702/56 |
| 2008/0065337 A1* | 3/2008 | Huang et al. | 702/66 |
| 2008/0253625 A1* | 10/2008 | Schuckers et al. | 382/125 |
| 2008/0253626 A1* | 10/2008 | Shuckers et al. | 382/125 |
| 2008/0269628 A1* | 10/2008 | Koertge et al. | 600/523 |
| 2009/0037147 A1* | 2/2009 | Lu | 702/190 |
| 2009/0116595 A1* | 5/2009 | Senroy et al. | 375/350 |
| 2009/0222261 A1* | 9/2009 | Jung et al. | 704/219 |
| 2009/0281812 A1* | 11/2009 | Jung et al. | 704/500 |
| 2009/0292180 A1* | 11/2009 | Mirow | 600/301 |
| 2010/0074496 A1* | 3/2010 | Pao et al. | 382/131 |
| 2010/0092028 A1* | 4/2010 | Huang et al. | 382/100 |
| 2010/0109881 A1* | 5/2010 | Eskandarian et al. | 340/575 |
| 2010/0179974 A1* | 7/2010 | Pao et al. | 708/207 |
| 2011/0015532 A1* | 1/2011 | Koertge et al. | 600/509 |
| 2011/0057818 A1* | 3/2011 | Jung et al. | 341/50 |
| 2011/0158259 A1* | 6/2011 | Chen et al. | 370/482 |
| 2011/0245628 A1* | 10/2011 | Baker et al. | 600/301 |
| 2012/0087553 A1* | 4/2012 | Schuckers et al. | 382/124 |
| 2012/0089372 A1* | 4/2012 | Pao et al. | 702/190 |
| 2012/0253694 A1* | 10/2012 | Young et al. | 702/34 |
| 2013/0190638 A1* | 7/2013 | Chon et al. | 600/521 |

OTHER PUBLICATIONS

Khaldi, K., Boudraa, A.-O., Bouchikhi, A, Alouane, M.T.-H., Diop, E.-H.S., Speech signal noise reduction by EMD, 2008. ISCCSP 2008, $3^{rd}$ International Symposium on Communications, Control and Signal Processing, pp. 1155-1158.*

Gabriel Rilling and Patrick Flandrin, One or Two Frequencies? The Empirical Mode Decomposition Answers, IEEE Transactions on Signal Processing. vol. 56. No. 1, Jan. 2008.*

D. Rouvre, D. Kouame, F. Tranquart, and L. Pourcelot, Empirical Mode Decomposition (EMD) for muli-gate, multi-transducer Ultrasound Doppler fetal heart monitoring, 2005 IEEE International Symposium on Signal Processing and Information Technology.*

G. Rilling, P. Flandrin, and P. Goncalves, On Empirical Mode Decomposition and Its Algorithms, Dec. 2003.*

H. Liang, Q-H Lin, and J. D. Z. Chen, Application of the Empirical Mode Decomposition to the Analysis of Esophageal Manometric Data in Gastroesophageal Reflux Disease, IEEE Transactions on Biomedical Engineering, vol. 52, No. 10, Oct. 2005.*

A. Nimunkasr and W. Tompkins, EMD-based 60-Hz noise filtering of the ECG, Proceeding of the $29^{th}$ Annual International Conference of the IEEE EMBS, Aug. 23-26, 2007.*

* cited by examiner

METHODS AND SYSTEMS FOR DETECTION FROM AND ANALYSIS OF PHYSICAL SIGNALS

CROSS REFERENCE TO RELATED APPLICATIONS

This application claims priority to U.S. Provisional Application Ser. No. 61/375,570, filed Aug. 20, 2010, entitled, "METHODS AND SYSTEMS FOR DETECTION FROM AND ANALYSIS OF PHYSICAL SIGNALS," which is incorporated by reference herein in its entirety for all purposes.

BACKGROUND

These teachings relate generally to a computer implemented physical signal analysis method and apparatus, such as, but not limited to, biophysical and geophysical, imaging and speech, signal analysis method and apparatus.

Analyzing typical physical signals is a difficult problem confronting many industries. Industries have harnessed various computer implemented methods to process data taken from biophysical phenomena, such as, but not limited to, electrocardiogram signals, signals from esophageal manometric data, ultrasound data such as, data from fetal heart monitor, data from geophysical phenomena such as earthquakes, ocean waves, tsunamis, ocean surface elevation and wind, images and also speech data.

Among the difficulties is that representing physical processes with physical signals may present one or more of the following problems:

(a) The total data span is too short;
(b) The data are nonstationary; and
(c) The data represent nonlinear processes.

Computer implemented Empirical Mode Decomposition method which decomposes physical signals representative of a physical phenomenon into components have been effective in the analysis of physical signals. These components are designated as Intrinsic Mode Functions (IMFs) and are indicative of intrinsic oscillatory modes in the physical phenomenon. The basic EMD method is disclosed in U.S. Pat. No. 5,983,162 and U.S. Pat. No. 6,311,130, both of which are incorporated by reference herein in their entirety for all purposes.

Some examples of signals from physical processes are given below.

Earthquake Signals

Earthquakes are typically recorded by seismometers such as the seismometer 400 which may be implemented with the Ranger seismometer manufactured by kinemetrics Model WR-1 Wide-Band which records ground accelerations to produce a signal representative of the earthquake.

Fortunately, all earthquakes are transient lasting only a few tenths to a few seconds at most; consequently, earthquake signals are nonstationary. Most earthquake signals are still processed with various computer implemented methods that apply algorithms based on Fourier analysis (Hu, et al. Earthquake Engineering, Chapman & Hall, London, 1996). Such earthquake signals are processed to better understand, for example, crust structure geophysics, near field earthquakes and site specific ground motions.

Crust structure geophysics is a term for the geophysical structure of the earth which includes the crust and inner core. Due to the different geophysical properties of the local crust material, the earthquake signal can be used to determine the mode of earthquake wave propagation, their dispersion characteristics, and the free oscillations. These properties can be used to infer the structure of the crust, and the elastic properties and density of the crust medium through which the wave propagated.

Most seismologists are interested in the earthquake signals to infer the geophysical properties of the earth as explained above. Earthquake engineers, however, are interested in the destructive power of the earthquakes. Therefore, the seismologists prefer sampling the earthquake signal from a long distance, up to thousand of miles say, to infer the geophysical properties of the crust along the path of wave propagation. On the other hand, earthquake engineers are most interested in the immediate neighborhood of the earthquake epicenter (near field earthquakes), within a few kilometers say, where the destruction would be the most severe.

For any given earthquake, the ground response is site specific and depends on the following factors: (1) nature of the earthquake (whether it is a shear or a thrust), (2) the propagation path, (3) the local ground geo-engineering properties (whether it is rock or sediment), and (4) the local topographic geometry (e.g., whether in a valley or on the top of a hill). These factors influence the severity of the ground motion from a given earthquake at specific locations.

Conventional methods, however, cannot reveal detailed information in the dispersion properties, the wave form deformation, and the energy-frequency distribution of earthquakes because the data representing the earthquake is nonlinear and nonstationary. Revealing this information is necessary to correctly understand crust structure geophysics and to accurately deduce site specific ground motions.

Furthermore, most near field strong earthquake ground motions are nonstationary because of their extremely short duration. Seismic records representing such earthquakes always give artificially wide Fourier spectra because of this nonstationarity. This wide frequency distribution will dilute the energy content everywhere on the frequency axis and distort the true energy-frequency distribution. The result is that the energy density at critical resonant frequencies for specific building structures will be underestimated. The rule of thumb for the resonant frequency is given as $1/(0.1N)$ cycle per second, where N is the number of the stories of the building. Therefore, for a ten-story building, the resonant frequency is near 1 Hz. For high-rises, the frequency will be even lower.

Water Wave Signals

The dynamics of ocean waves are measured from ocean sensors located at field stations such as the ocean wave sensor 410 which may be implemented by using the NDBC 3m discus ocean wave sensor which records an ocean wave signal representing ocean surface elevation as a function of time. Ocean waves are studied for ship design, ship routing, coastal and off-shore structure design, harbor operations, and even weather forecasting.

Ocean wave signals are typically random and nearly nonstationary. In the past, ocean wave signals were analyzed by applying computer implemented Fourier analysis. In fact, the studies of the wave spectra from Fourier analysis have been a main subject of ocean wave research (see, for example, Huang, et al., 1990a, Wave Spectra, The Sea, 9, 197-237).

Traditional computer implemented analysis methods, however, are not well suited to studying ocean wave signals because ocean waves are typically nonlinear and nonstationary. The Wavelet spectrum gives a nearly continuous distribution, and wide spread of energy consisting primarily of harmonics in the frequency axis. This energy spread is due to the nonlinear and nonstationary character of ocean waves. This energy spread also contributes to the difficulty in analyzing the results of traditional computer implemented techniques applying the Wavelet transform.

Water wave signals detected from mechanically generated water waves by a wave sensor have been studied to analyze nonlinear water wave evolution processes (eg. Huang, et al., The Mechanism for Frequency Downshift in Nonlinear Wave Evolution, Advances in Applied Mechanics, Vol. 32, pp. 59-117 1996).

Due to weak nonlinear interactions, the frequency of the water waves will downshift as they propagate, a process necessary for the waves to become longer and grow higher under the wind.

In the narrow-band wave field, the downshift has been shown as the consequence of the Benjamin-Fier instability (Benjamin and Fier, The Disintegration of Wavetrains on Deep Water, Part I, Theory, J. Fluid Mech., 27, 417-430, 1967). Although water wave evolution is generally assumed to be gradual and continuous, several authors have theorized that the evolution is not continuous and gradual, but local and discrete.

The resolution power of previous data analysis techniques, however, has rendered proof of this theory nearly impossible. As explained above, computer implemented data analysis techniques, prior to the use of EMD, were incapable of accurately interpreting nonlinear, nonstationary processes such as water wave propagation and evolution.

Tsunami Signals

Tsunamis are detected with tidal gauges such as the tidal gauge 430 which record water elevation as a function of time.

Although tidal signals are generally stationary, tsunami waves are transient, nonlinear and nonstationary. Tidal gauges necessarily measure both the tide and the tsunami. The combined signal, therefore, is nonstationary and nonlinear.

Filtering cannot remove the tsunami signal cleanly because the tsunami signals and the tidal signals usually have many harmonic components in the same frequency range. Therefore, tsunami signals and combined tsunami-tidal signals, prior to the use of EMD, lacked an effective computer implemented data analysis method which is able to handle the nonlinear and nonstationary character of the data representative of these geophysical processes.

Ocean Altitude and Ocean Circulation

Satellite altimetry is a powerful technique for large scale ocean circulation studies (Huang, et al. 1978, "Ocean Surface Measurement Using Elevation From GEOS-3 Altimeter", J. Geophys. Res., 83, 4, 673-4, 682; Robinson, et al., 1983, "A Study of the Variability of Ocean Currents in the Northwestern Atlantic Using Satellite Altimetry", J. Phys. Oceanogr., 13, 565-585). An orbital satellite system can produce extremely accurate data representing the altitude of the ocean surface.

The accepted view of the equatorial dynamics is the propagation of Kelvin waves forced by variable wind stress (Byod, 1980, "The Nonlinear Equatorial Kelvin Waves", J. Phys. Oceanogr., 10, 1-11 and Zheng, et al., 1995, "Observation of Equatorially Trapped Waves in the Pacific Using Geosat Altimeter Data", Deep-Sea Res., (in press). In this model, the wave propagation will leave a surface elevation signature of the order of 10 cm, which can be measured by the satellite altimeter 440.

Because of the importance of the equatorial region in determining the global climate pattern, altimeter data have been used extensively to study the dynamics of this region (Miller, et al., 1988, "GEOSAT Altimeter Observation of Kelvin Waves and the 1986-1987 El Nino" Science, 239, 52-54; Miller, et al., 1990, "Large-Scale Meridional Transport in the Tropic Pacific Ocean During the 1986-87 El Nino from GEOSAT", J. Geophys. Res. 95, 17, 905-17, 919.; Zheng, et al., 1994, "The Effects of Shear Flow on Propagation of Rossby Waves in the Equatorial Oceans", J. Phys. Oceanogr., 24, 1680-1686 and Zheng, et al., 1995, "Observation of Equatorially Trapped Waves in the Pacific Using Geosat Altimeter Data", Deep-Sea Res., (in press)). A typical time series on the Equator sea surface elevation data at 174.degree.

Limited by the data length and complicated by ocean dynamics, all the past investigators, prior to their use of EMD, faced serious problems in processing this nonstationary altimeter data. Therefore, weather forecasting which accurately accounts for ocean effects has been impossible with traditional computer implemented data analysis methods.

Ultrasound Fetal Heart Monitoring

The application of EMD to ultrasound Doppler fetal heart monitoring is described in Rouvre, D.; Kouame, D.; Tranquart, F.; Pourcelot, L, *Empirical mode decomposition (EMD) for multi-gate, multi-transducer ultrasound Doppler fetal heart monitoring*, Proceedings of the Fifth IEEE International Symposium on Signal Processing and Information Technology, 2005, which is incorporated by reference herein is entirety for all purposes. As stated in that paper, "Ultrasound (US) Doppler provides both detection of the FHR and fetal movements of the fetus, thus providing more information on fetal well-being, and is widely used for FHR monitoring. Whether mono or bi-transducer, these systems using continuous or pulsed ultrasound waves provide partial automated detection of movements and fetal breathing . . . . Classical [before EMD] autocorrelation based Fetal HeartRate (FHR) detection is not always satisfactory." See also Nimunkar, A. J., Tompkins, W. J., *EMD-based 60-Hz noise filtering of the ECG,* 29th Annual International Conference of the IEEE Engineering in Medicine and Biology Society, 2007. EMBS 2007, Page(s): 1904-1907; Hualou Liang, Qiu-Hua Lin, Chen, J. D. Z.; *Application of the empirical mode decomposition to the analysis of esophageal manometric data in gastroesophageal reflux disease*, IEEE Transactions on *Biomedical Engineering*, Volume: 52 Issue: 10 Date: October 2005, Page(s): 1692-1701, all of which are incorporated by reference herein in their entirety for all purposes.

Speech Signals

Speech signals are nonstationary, which makes them less amenable to Fourier analysis. Speech signals have been decomposed into different oscillatory modes, IMFs, utilizing EMD. The resonant frequencies of the vocal tract can then be extracted in order to obtain a description of the speech production model. See, for example, Aicha Bouzid, Noureddine Ellouze, EMD Vocal Tract Frequency Analysis of Speech Signal, 4th International Conference: Sciences of Electronic, Technologies of Information and Telecommunications, Mar. 25-29, 2007—TUNISIA; Khaldi, K., Boudraa, A.-O., Bouchikhi, A, Alouane, M. T.-H., Diop, E.-H. S., Speech signal noise reduction by EMD, 2008. ISCCSP 2008, 3rd International Symposium on Communications, Control and Signal Processing, Page(s): 1155-1158, which are Incorporated by reference herein in their entirety for all purposes.

Images

EMD has also been utilized in analysis of images, such as texture extraction and image filtering. See, for example, J. C. Nunes, Y. Bouaoune, E. Delechelle, O. Niang, Ph. Bunel, Image analysis by bidimensional empirical mode decomposition, Image and Vision Computing 21 (2003) 1019-1026, which is incorporated by reference herein in its entirety for all purposes.

Although the EMD method has been applied for different physical signals, the EMD method fails in many cases where the data contains two or more frequencies are close to each other. Unfortunately this condition is typical of many physical signals.

Therefore, there is a need for improved EMD methods.

BRIEF SUMMARY

In one embodiment of the method of these teachings for detection of physical phenomena from or analysis of physical signals, an improved Empirical Mode Decomposition method of these teachings decomposes physical signals representative of a physical phenomenon into components.

In one embodiment of the system of these teachings for detection of physical phenomena from or analysis of physical signals, the system includes one or more processors and computer usable media that has computer readable code embodied therein, the computer readable code causing the one or more processors to utilize an improved Empirical Mode Decomposition method of these teachings to decompose physical signals representative of a physical phenomenon into components.

For a better understanding of the present teachings, together with other and further objects thereof, reference is made to the accompanying drawings and detailed description and its scope will be pointed out in the appended claims.

DETAILED DESCRIPTION

Figure 1A:
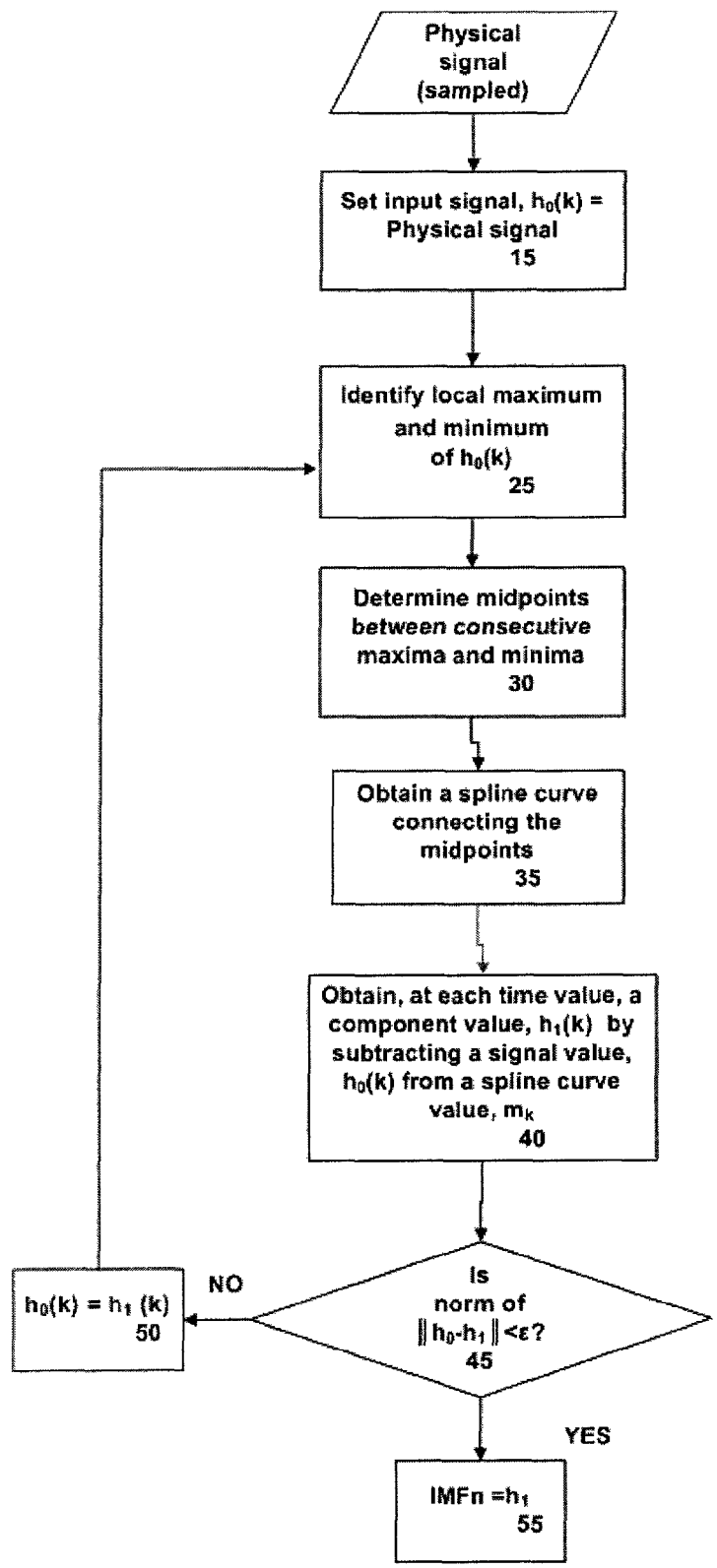
FIGS. 1a-1c are flowchart representations of embodiments of the method of the present teachings.

The following detailed description is of the best currently contemplated modes of carrying out these teachings. The description is not to be taken in a limiting sense, but is made merely for the purpose of illustrating the general principles of these teachings, since the scope of these teachings is best defined by the appended claims.

The following definitions are present in order to aid in the understanding of the present teachings.

Intrinsic Mode Function

A Intrinsic Mode Function (IMF) is a function that satisfies the following two conditions:

(a) in the whole data set, the number of extrema and the number of zero-crossings must either be equal or differ at most by one, and (b) at any point, the mean value of the envelope defined by the local maxima and the envelope defined by the local minima is zero.

The first condition shares some similarity to the traditional narrow band requirements for a stationary Gaussian process. The second condition is a totally new idea. Conceptually, the second condition modifies the classical global requirement to a local one. Furthermore, the second condition has the desirable result that the instantaneous frequency will not have unwanted fluctuations induced by asymmetric wave forms. Mathematically, the second condition should ideally be "the local mean of the data being zero." For nonstationary data, the "local mean" requires a "local time scale" to compute the mean, which is not amenable to definition. Fortunately, the local time scale need not be defined to fulfill the second condition, as will be discussed below.

To apply these concepts to physical data, the invention utilizes the local mean of the signal envelopes to force the local symmetry. The signal envelopes are defined by the local maxima and the local minima. This is an approximation which avoids the definition of a local averaging time scale. With the physical approach and the approximation adopted here, the inventive method does not always guarantee a perfect instantaneous frequency under all conditions. Nevertheless, it can be shown that, even under the worst conditions, the instantaneous frequency so defined is still consistent with the physics of the system being studied and represents the system being studied much more accurately than previous techniques based on Fourier analysis.

The term "Intrinsic Mode Function" is adopted because it represents the oscillation mode embedded in the data. With this definition, the IMF in each cycle, defined by the zero-crossings, involves only one mode of oscillation. In other words, each IMF represents only one group of oscillation modes or time scales and no riding waves are allowed.

"Spline," as used herein, refers to a substantially smooth piecewise-polynomial function.

Before presenting the EMD method of these teachings for decomposing the data into IMFs, a qualitative assessment of the intrinsic oscillatory modes may be roughly determined by simply examining the data by eye. From this examination, one can immediately identify the different scales directly in two ways: the time lapse between the successive alternations of local maxima and minima and the time lapse between the successive zero-crossings reveals the different scales. The interlaced local extrema and zero-crossings give us complicated data: one undulation is riding on top of another, and they, in turn, are riding on still other undulations, and so on. Each of these undulations defines a characteristic scale or oscillation mode that is intrinsic to the data: hence, the term "Intrinsic Mode Function" is adopted.

To reduce the data into the needed IMFs, the invention utilizes a computer implemented Empirical Mode Decomposition Method which is described below.

Empirical Mode Decomposition (EMD): The Sifting Process

First, the Empirical Mode Decomposition method which deals with both nonstationary and nonlinear data will be discussed. Then, the physical meaning of this decomposition will be presented.

The EMD method identifies empirically the intrinsic oscillatory modes by their characteristic time scales in the data, and then decompose the data accordingly. A systematic way to extract the intrinsic mode functions is the computer implemented improved (enhanced) Empirical Mode Decomposition method or Sifting Process of these teachings.

In one embodiment, the method of these teachings includes obtaining an intrinsic mode function indicative of intrinsic oscillatory behavior of the physical signal by the steps of identifying local maximum and minimum of a signal, the signal being the physical signal in an initial step and the signal being sampled at a number of time values, determining a number of midpoints, each midpoints being between consecutive maxima and minima, obtaining a spline curve connecting the midpoints, obtaining, at each time value from the number of time values, a component value by subtracting a signal value from a spline curve value, and recursively performing a sifting step until successive component signal values are substantially equal, wherein a signal comprising the component values of a resulting recursive sifting is the intrinsic mode function.

Referring to FIG. 1a, in the embodiment of the method of these teachings shown therein, a physical signal f(t) which is sampled at discrete times $\{t_k, k.=1 \ldots n\}$, where the physical signal is representative of a physical process, is utilized as input. At the start of the method, the physical signal is set equal to the input signal, $h_0(k)=f(t_k)$ (step 15, FIG. 1a) and the local maxima and minima of $h_0(k)$ are determined (step 25, FIG. 1a). the midpoints between consecutive maxima and minima are determined (step 30, FIG. 1a) and a spline curve connecting the midpoints is obtained (steps 35, FIG. 1a). At each time value, a component signal value, $h_1(k)$, is obtained by subtracting a signal value, $h_0(k)$ from a spline curve value, $m_k$ (step 40, FIG. 1a). For the component signal, it is determined whether the norm of $\|h_0-h_1\|<\epsilon$ (step 45, FIG. 1a). If the norm of $\|h_0-h_1\|<\epsilon$ (for some predetermined $\epsilon$), the intrinsic mode function is set equal to $h_1$, IMF=$h_1$ (step 55, FIG. 1a). If the norm of $\|h_0-h_1\|\geq\epsilon$, $h_0$ is set equal to $h_1$, $h_0(k)=h_1(k)$, and the process returns to step 25 (referred to as the "Sifting process" or recursively performing a sifting step).

In another embodiment, the method of these teachings also includes (a) obtaining a signal equal to a difference between the physical signal and a sum of previously obtained intrinsic mode functions, (b) obtaining another intrinsic mode function by the steps for obtaining the intrinsic mode function disclosed hereinabove, and (c) repeating steps (a) and (b) until a predetermined criterion is met. In one instance, the predetermined criterion includes a standard deviation computed between consecutively obtained sums of intrinsic mode functions being at most a predetermined value.

Figure 1B:
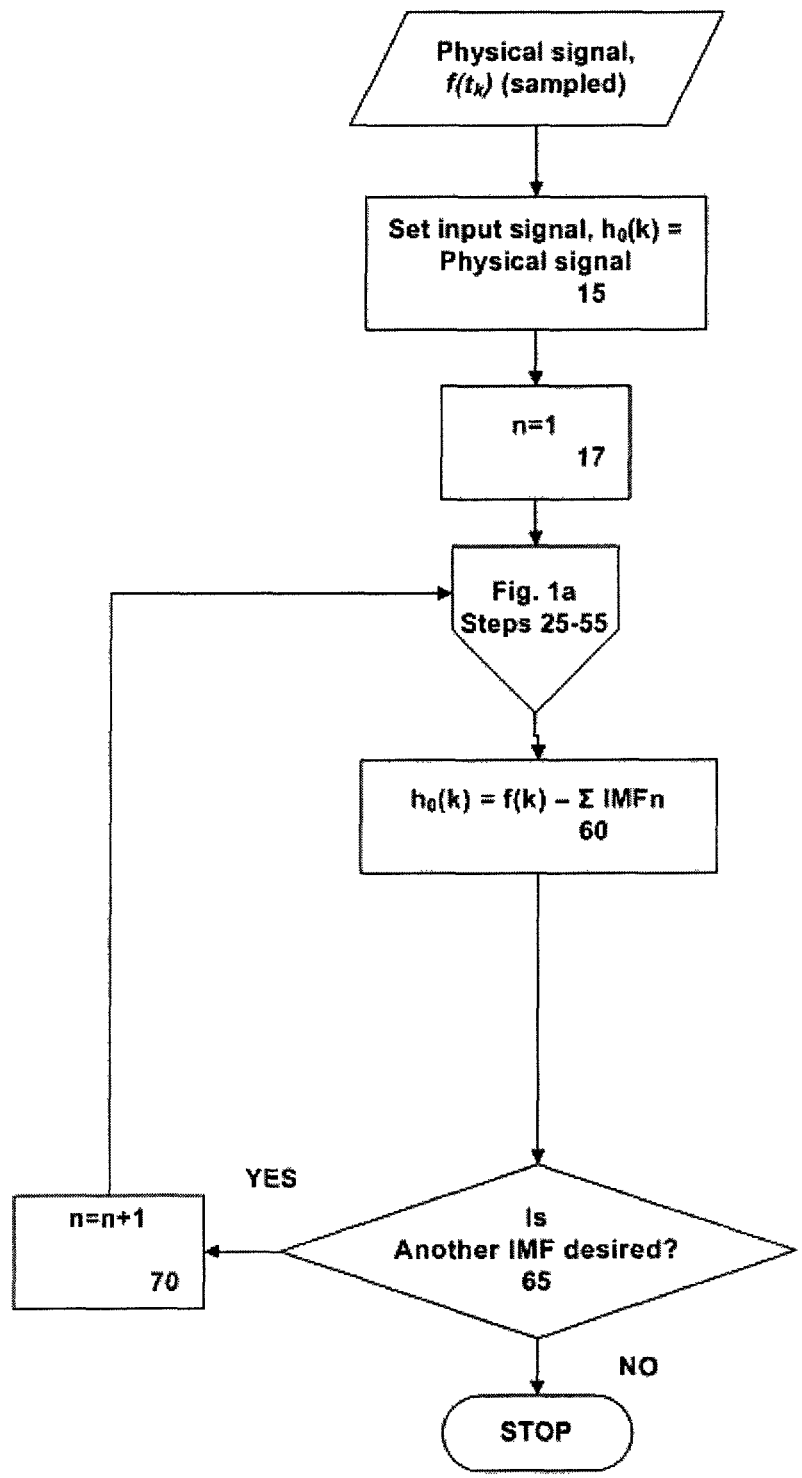

Referring to FIG. 1b, in the embodiment shown therein, additional steps are added to the embodiment shown in FIG. 1a in order to obtain additional intrinsic mode functions (IMFs). An intrinsic mode function identifier is set equal to one at the initial iteration (step 17, FIG. 1b). The process of FIG. 1a is executed. A signal equal to a difference between the physical signal and a sum of previously obtained intrinsic mode functions, $h_0(k)=f(k)-\Sigma \ IMF_n$, is obtained (step 60, FIG. 1b). If another IMF is desired (step 65, FIG. 1b), the intrinsic mode function identifier is incremented (step 70, FIG. 1b) and the process of FIG. 1a is performed again. The method continues until it is determined that another IMF is not desired. This determination, in one instance, not a limitation of these teachings, can be based on a standard deviation between consecutively obtained sums of intrinsic mode functions being at most a predetermined value.

In one instance, the method of these teachings for detection of physical phenomena from or analysis of physical signals, includes the steps of:
1. receiving as input a physical signal f (t) which is sampled at discrete times $\{t_k, k.=1 \ldots n\}$, where the physical signal is representative of a physical process.
2. Start the method by letting $h_0(k)=f(t_k)$
3. Identify the max and min of $h_0(k)$.
4. find the midpoints between two consecutive maxima and minima and let $N_k$ be the values of $h_0$ at these points
5. Create the spline curve. Mk that connects the points $N_k$.
6. At each time $t_k$ evaluate the value of Mk, $m_k$.
7. Evaluate $h_1(k)=h_0(k)-m_k$.
8. If norm of $\|h_0-h_1\|<\epsilon$ for some predetermined $\epsilon$ set the first intrinsic function IMF=$h_1$ (and stop).
9. if the criteria of (8) are not satisfied set $h_0(k)=h_1(k)$ and return to (3) ("Sifting process").

Results of an exemplary embodiment, not a limitation of these teachings, are shown in FIGS. 2 through 7. Other results are shown in Mayer Humi, A Modified EMD Algorithm and its Applications, Proceedings of the International Conference on Scientific Computing, pp. 48-54, Editors H.R. Arabnia and G.A. Gravvanis, Published by CSREA Press (2011), which is incorporated by reference herein in its entirety for all purposes. The above method is an improvement over the EMD method previously disclosed in U.S. Pat. No. 5,983,162, which is incorporated by reference herein in its entirety for all purposes. The method of these teachings can obtain the IMF for signals where the conventional EMD fails. Furthermore, for signals where the conventional EMD can be applied, the method of these teachings results in fewer iterations and less computational effort.

In order to process two-dimensional signals, the present teachings decompose two-dimensional signals into a series of one-dimensional profiles. Each of the one-dimensional profiles is then subjected to the method of these teachings.

The EMD method of these teachings is applied to the two-dimensional physical signals in a manner similar to the conventional EMD method. See U.S. Pat. No. 6,311,130, which is incorporated by reference herein in its entirety for all purposes.

As in U.S. Pat. No. 6,311,130, the term "two-dimensional signal" is used herein to denote the measurement of a physical quantity across two-dimensions. For example, two-dimensional signals include two-dimensional images generated by a digital camera that measures luminance across two-dimensions.

Figure 1C:
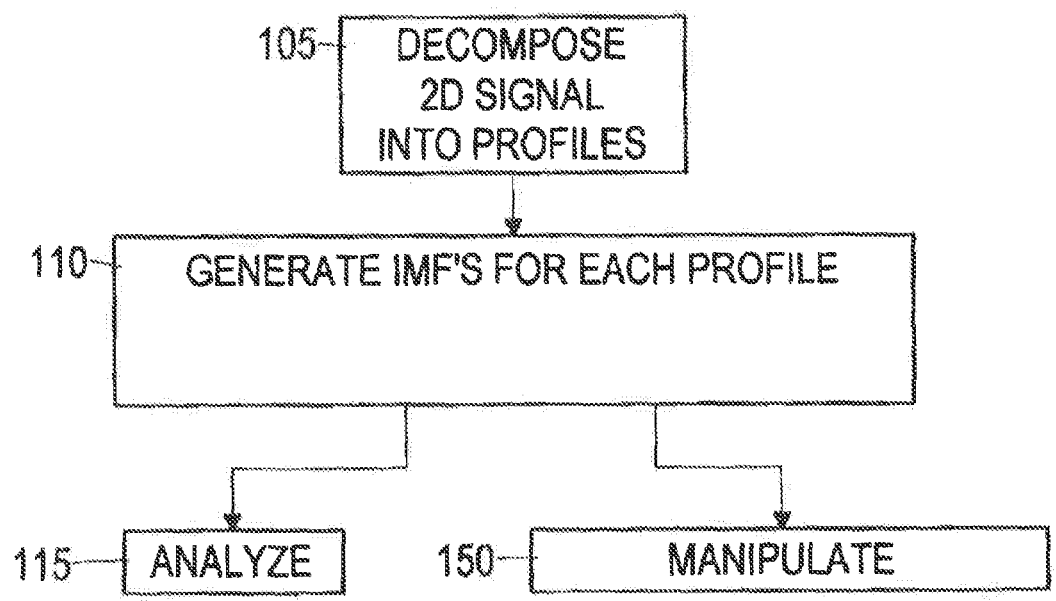
Figure 2:
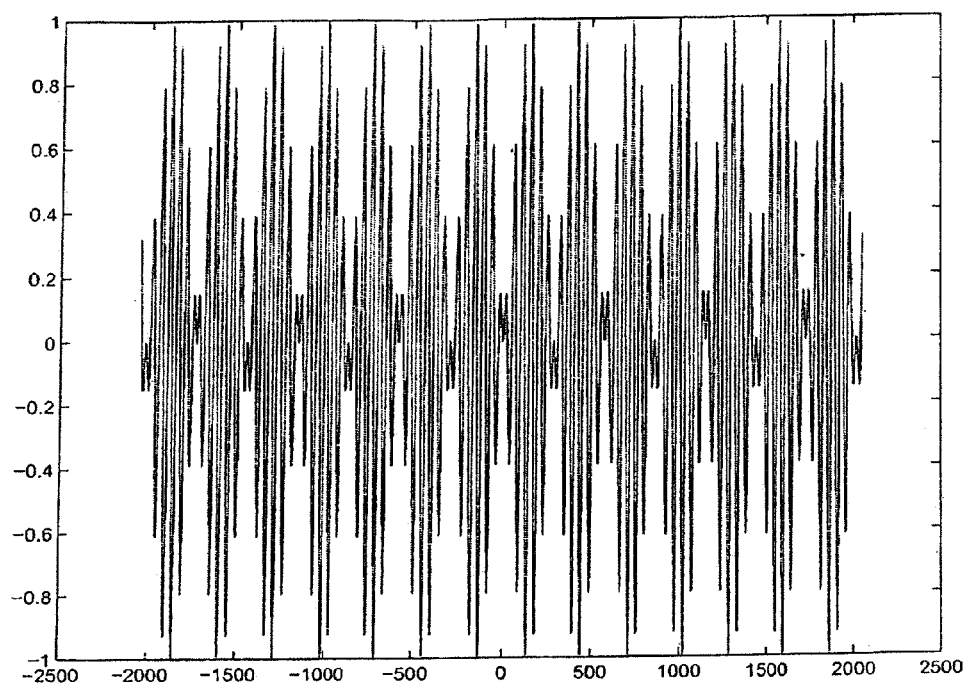
FIGS. 2 through 7 are graphical representations of results of the method of the present teachings.
Figure 3:
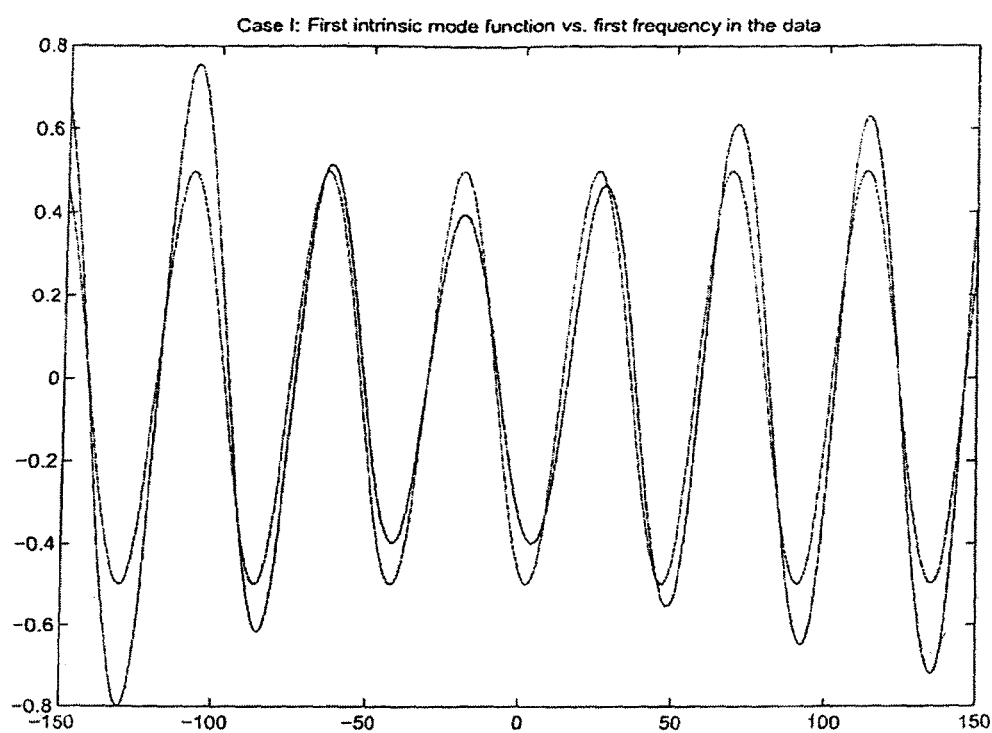
Figure 4:
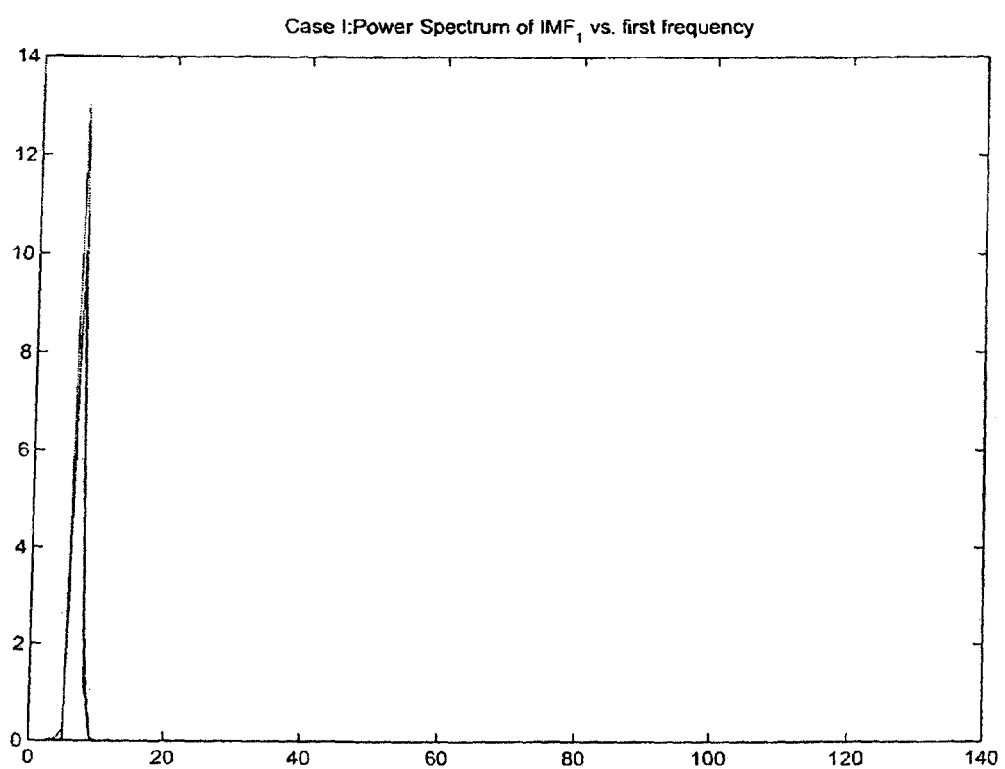
Figure 5:
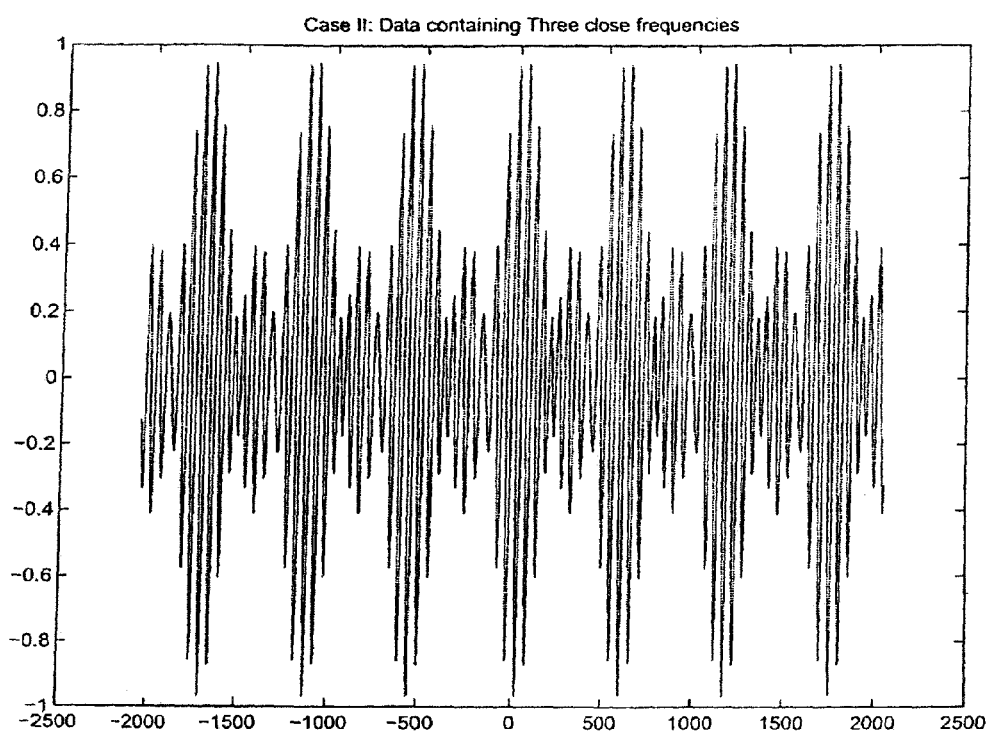
Figure 6:
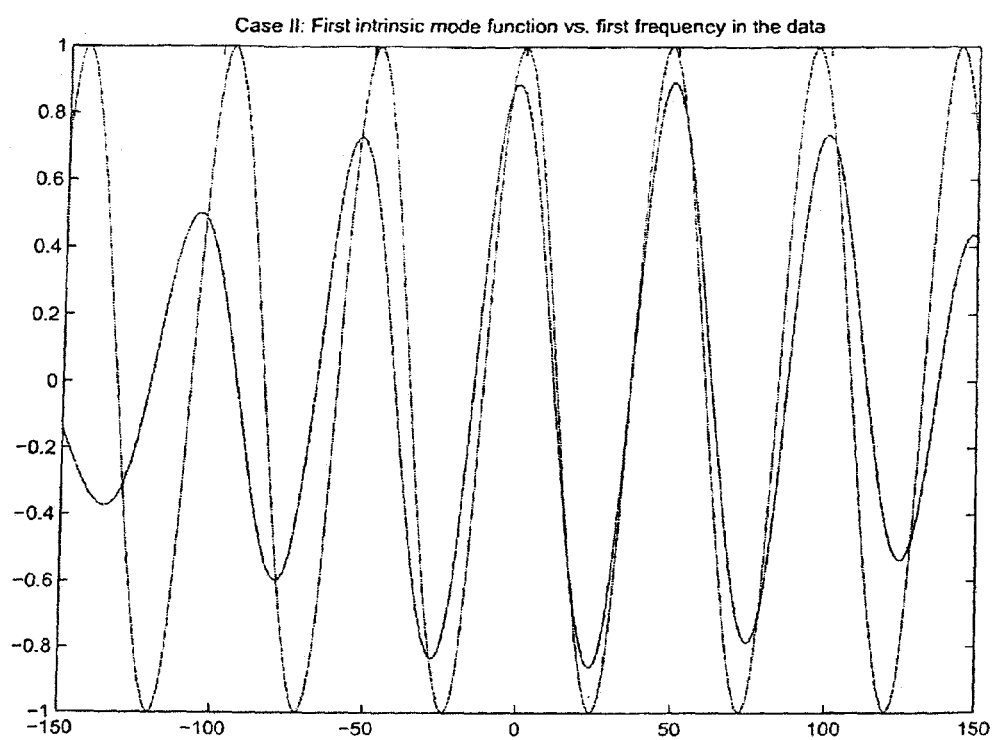
Figure 7:
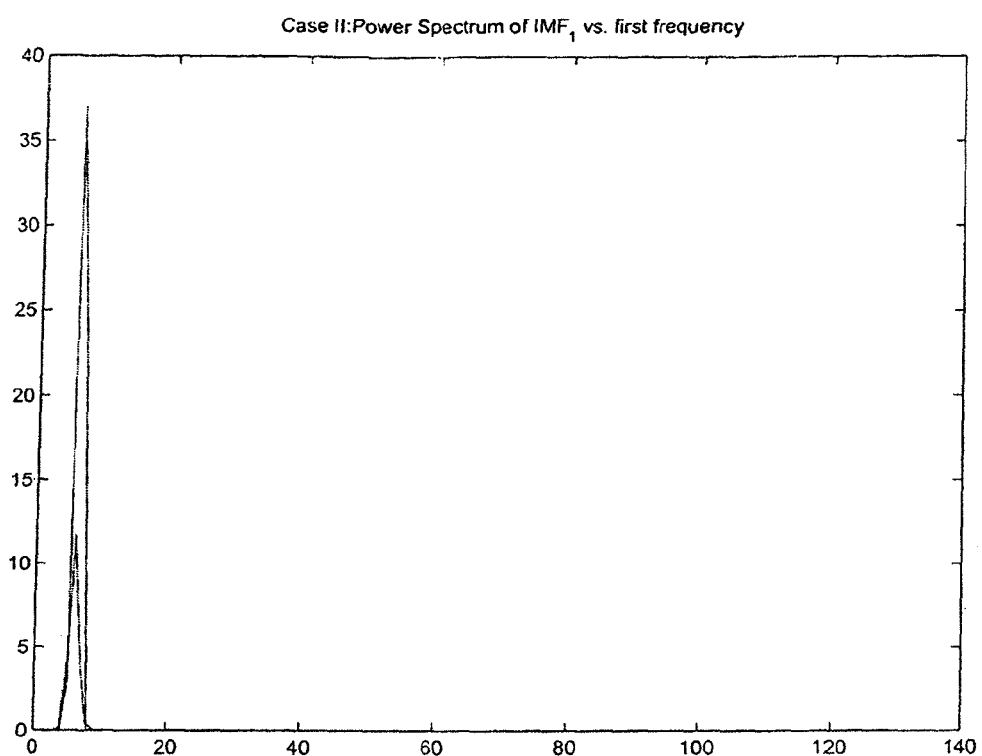

FIG. 1(c) illustrates an embodiment of the method of these teachings for processing two-dimensional signals including the generation of intrinsic mode functions (the Sifting Process) in step 110.

To begin the processing illustrated in FIG. 1(c), the two-dimensional physical activity, process or phenomenon is sensed by an appropriate sensor in step 100. For example an image of a physical phenomenon may be sensed by a digital camera to generate a two-dimensional digital signal.

Then, step 105 decomposes the two-dimensional digital signal into one-dimensional profiles. The profiles are preferably mutually parallel. In other words, the two-dimensional signal is separated into a series of one-dimensional signals. For example, each of the one-dimensional profiles may be one of the parallel scanning lines of a two-dimensional image.

If the two-dimensional signal is an image then it is convenient to form each profile from a line (horizontal or vertical) of the image. As an alternative, the profiles may be generated by decomposing the two-dimensional signal into diagonal lines.

Once the two-dimensional signal is decomposed into profiles (step 105), a one-dimensional EMD may be utilized in step 110 to sift the profiles and extract intrinsic mode functions for each profile. In other words, each profile is individually processed by a one-dimensional EMD of these teachings to extract IMF's for that profile. By sequentially processing each profile, a collection of IMF's may be generated for the two-dimensional signal.

Figure 8:
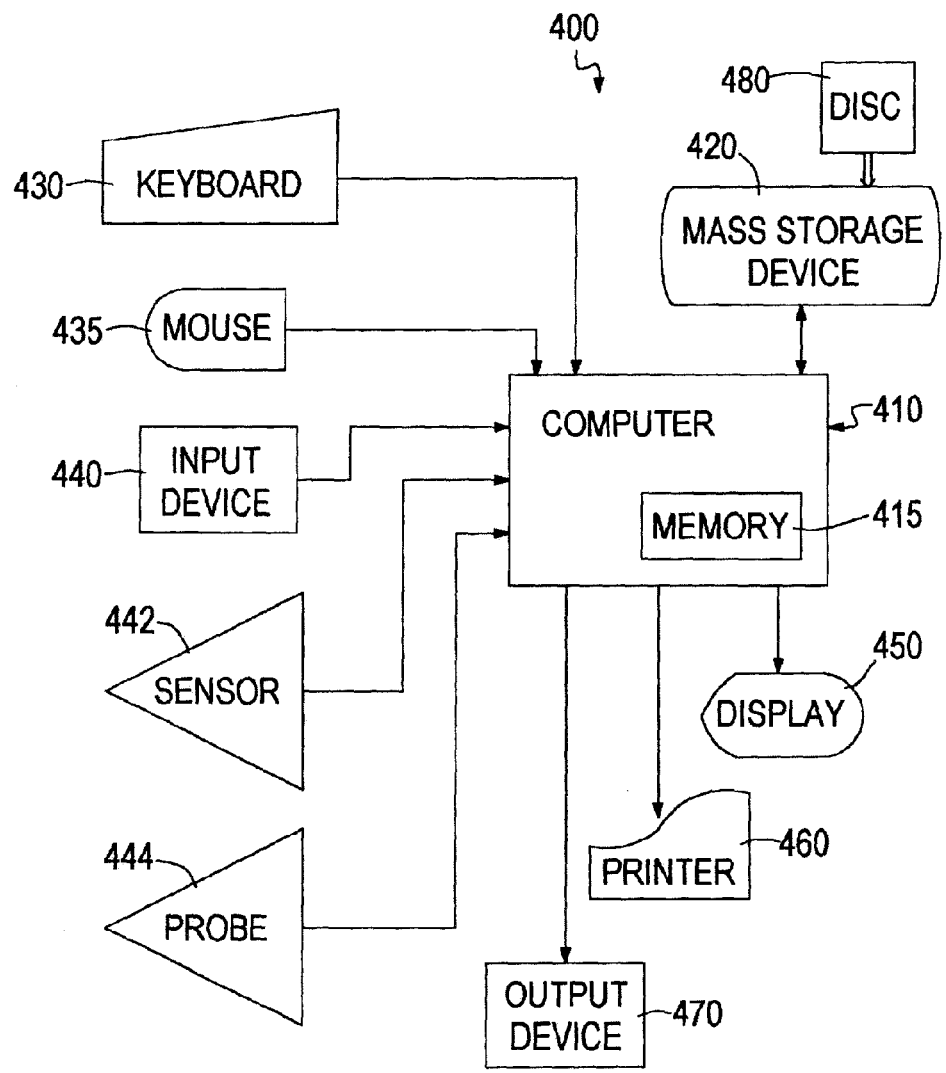
FIG. 8 is a block diagram representation of an embodiment of the system of the present teachings

A computer suitable for programming with the method of these teachings is diagrammatically shown in the block diagram of FIG. 8. The computer 410 is preferably part of a computer system 400 and includes one or more processors. To allow human interaction with the computer 410, the computer system includes a keyboard 430 and mouse 435. The computer programmed with the method of these teachings is analogous to a mechanical sieve: it separates digital data into series of IMF's according to their time scales in a manner analogous to a mechanical sieve which separates aggregated sand according to their physical size.

Because the present teachings are applied to analyze physical signals, the computer system 400 also includes an input device 440 such as a digital camera, sensor 442 and/or probe 444 which are used to sample a physical phenomenon and generate a one-dimensional or two-dimensional physical signal representative thereof.

To output the results of the computer implemented method, the computer system 400 also includes a display 450 such as a cathode ray tube or flat panel display, printer 460 and output device 470.

Furthermore, the computer system 400 also includes one or more computer usable media 420. The one or more computer usable media 420 may be a hard disk, floppy disc, optical disc, etc. The mass storage device 420 may be used to store a computer program which performs the invention when loaded into the computer 410. As an alternative, the input device 440 may be a network connection or off-line storage which supplies the computer program to the computer 410.

More particularly, the computer program embodiment of the invention may be loaded from the mass storage device 420 into the internal memory 415 of the computer 410. The result is that computer 410 is transformed into a special purpose machine that implements these teachings.

Even more particularly, each step of inventive method will transform at least a portion of the general purpose computer 410 into a special purpose computer module implementing that step. For example, when the sifting method of FIGS. 1a-1c is implemented on the computer 410, the result is a computer implemented sifting apparatus (sifter) that performs the sifting methods of sifting FIGS. 1a-1c.

Other embodiments of the invention include firmware embodiments and hardware embodiments wherein the inventive method is programmed into firmware (such as EPROM, PROM or PLA) or wholly constructed with hardware components. Constructing such firmware and hardware embodiments of the invention would be a routine matter to one of ordinary skill using known techniques.

For the purposes of describing and defining the present teachings, it is noted that the term "substantially" is utilized herein to represent the inherent degree of uncertainty that may be attributed to any quantitative comparison, value, measurement, or other representation. The term "substantially" is also utilized herein to represent the degree by which a quantitative representation may vary from a stated reference without resulting in a change in the basic function of the subject matter at issue.

Elements and components described herein may be further divided into additional components or joined together to form fewer components for performing the same functions.

Each computer program may be implemented in any programming language, such as assembly language, machine language, a high-level procedural programming language, or an object-oriented programming language. The programming language may be a compiled or interpreted programming language.

Each computer program may be implemented in a computer program product tangibly embodied in a computer-readable storage device for execution by a computer processor. Method steps of the invention may be performed by a computer processor executing a program tangibly embodied on a computer-readable medium to perform functions of the invention by operating on input and generating output.

Common forms of computer-readable media include, for example, a floppy disk, a flexible disk, hard disk, magnetic tape, or any other magnetic medium, a CDROM, any other optical medium, any physical medium with patterns of holes, a RAM, a PROM, and EPROM, a FLASH-EPROM, any other memory chip or cartridge. As stated in the USPTO 2005 Interim Guidelines for Examination of Patent Applications for Patent Subject Matter Eligibility, 1300 *Off. Gaz. Pat. Office* 142 (Nov. 22, 2005), "On the other hand, from a technological standpoint, a signal encoded with functional descriptive material is similar to a computer-readable memory encoded with functional descriptive material, in that they both create a functional interrelationship with a computer. In other words, a computer is able to execute the encoded functions, regardless of whether the format is a disk or a signal."

Although the teachings have been described with respect to various embodiments, it should be realized these teachings are also capable of a wide variety of further and other embodiments within the spirit and scope of the appended claims.

What is claimed is:

1. A computer implemented method for analyzing a physical signal obtained from a physical process, the method being implemented by a processor and computer usable media having computer readable code embodied therein, the computer readable code causing the processor to implement steps in the method, the computer implemented method comprising the step of:
    obtaining an intrinsic mode function indicative of intrinsic oscillatory behavior of the physical signal by the steps of:
        identifying local maximum and minimum of a signal; the signal being the physical signal in an initial step; the signal being sampled at a number of time values;
        determining a number of midpoints; each midpoints being between consecutive maxima and minima;
        obtaining a spline curve connecting the midpoints;
        obtaining, at each time value from the number of time values, a component value by subtracting a signal value from a spline curve value; and
        recursively performing a sifting step until successive component signal values are substantially equal; wherein a signal comprising the component values of a resulting recursive sifting is the intrinsic mode function;
    wherein the physical signal is a one-dimensional physical signal.

2. The method of claim 1 further comprising the step of obtaining another intrinsic mode function by the steps of:
    obtaining a signal equal to a difference between the physical signal and the intrinsic mode function;
    obtaining said another intrinsic mode function by the steps for obtaining the intrinsic mode function as given in claim 1.

3. The method of claim 1 further comprising the steps of:
    obtaining one or more other intrinsic mode functions by the steps of:
        (a) obtaining a signal equal to a difference between the physical signal and a sum of previously obtained intrinsic mode functions;
        (b) obtaining another intrinsic mode function by the steps for obtaining the intrinsic mode function as given in claim 1; and
        (c) repeating steps (a) and (b) if a further intrinsic mode function is desired.

4. The method of claim 1 further comprising the steps of:
    obtaining one or more other intrinsic mode function by the steps of:
        (a) obtaining a signal equal to a difference between the physical signal and a sum of previously obtained intrinsic mode functions;
        (b) obtaining another intrinsic mode function by the steps for obtaining the intrinsic mode function as given in claim 1; and (c) repeating steps (a) and (b) until a predetermined criterion is met.

5. The method of claim 4 wherein the predetermined criterion comprises a standard deviation between consecutively obtained sums of intrinsic mode functions being at most a predetermined value.

6. The method of claim 1 wherein the physical signal is a two-dimensional physical signal; and wherein the method further comprises the steps of:
decomposing the two-dimensional physical signal into a number of one-dimensional profiles; and
obtaining one one-dimensional intrinsic mode function from a number of one-dimensional intrinsic mode functions by the steps of claim 1.

7. The method of claim 1 wherein the physical signal is a speech signal.

8. The method of claim 3 wherein the physical signal is a speech signal; and wherein the one or more intrinsic mode functions are utilized in analyzing speech.

9. The method of claim 4 wherein the physical signal is a speech signal; and wherein the one or more intrinsic mode functions are utilized in analyzing speech.

10. A system for analyzing a physical signal obtained from a physical process, the system comprising:
one or more processors; and
one or more computer usable media having computer readable code embodied therein, said computer readable code causing said one or more processors to
obtain an intrinsic mode function indicative of intrinsic oscillatory behavior of the physical signal by the steps of:
identifying local maximum and minimum of a signal; the signal being the physical signal in an initial step; the signal being sampled at a number of time values;
determining a number of midpoints; each midpoints being between consecutive maxima and minima;
obtaining a spline curve connecting the midpoints;
obtaining, at each time value from the number of time values, a component value by subtracting a signal value from a spline curve value; and
recursively performing a sifting step until successive component signal values are substantially equal; wherein a signal comprising the component values of a resulting recursive sifting is the intrinsic mode function;
wherein the physical signal is a one-dimensional physical signal.

11. The system of claim 10 wherein, the computer readable code, in causing the one or more processors to obtain an intrinsic mode function, causes the one or more processors to:
obtain another intrinsic mode function by:
obtain a signal equal to a difference between the physical signal and the intrinsic mode function;
obtain said another intrinsic mode function by:
identifying local maximum and minimum of a signal; the signal being the signal equal to a difference between the physical signal and the intrinsic mode function in an initial step; the signal being sampled at a number of time values;
determining a number of midpoints; each midpoint being between consecutive maxima and minima;
obtaining a spline curve connecting the midpoints;
obtaining, at each time value from the number of time values, a component value by subtracting a signal value from a spline curve value; and
recursively performing a sifting step until successive component signal values are substantially equal; wherein a signal comprising the component values of a resulting recursive sifting is said another intrinsic mode function.

12. The system of claim 10 wherein, the computer readable code, in causing the one or more processors to obtain an intrinsic mode function, causes the one or more processors to:
obtain one or more other intrinsic mode functions by:
(d) obtaining a signal equal to a difference between the physical signal and a sum of previously obtained intrinsic mode functions;
(e) obtaining another intrinsic mode function utilizing the computer readable code as in claim 10 that causes the one or more processors to obtain the intrinsic mode function; and
(f) repeating steps (a) and (b) if a further intrinsic mode function is desired.

13. The system of claim 10 wherein, the computer readable code, in causing the one or more processors to obtain an intrinsic mode function, causes the one or more processors to:
obtain one or more other intrinsic mode functions by:
(a) obtaining a signal equal to a difference between the physical signal and a sum of previously obtained intrinsic mode functions;
(b) obtaining another intrinsic mode function utilizing the computer readable code as in claim 10 that causes the one or more processors to obtain the intrinsic mode function; and
(c) repeating steps (a) and (b) until a predetermined criterion is met.

14. The system of claim 13 wherein the predetermined criterion comprises a standard deviation between consecutively obtained sums of intrinsic mode functions being at most a predetermined value.

15. The system of claim 10 wherein the physical signal is a two-dimensional physical signal; and wherein the computer readable code, in causing the one or more processors to obtain an intrinsic mode function, causes the one or more processors to:
decompose the two-dimensional physical signal into a number of one-dimensional profiles; and
obtain one one-dimensional intrinsic mode function from a number of one-dimensional intrinsic mode functions utilizing the computer readable code of claim 10.

16. A non-transitory computer program product comprising:
one or more computer usable media having computer readable code embodied therein, said computer readable code causing said one or more processors to obtain an intrinsic mode function indicative of intrinsic oscillatory behavior of a physical signal by the steps of:
identifying local maximum and minimum of a signal; the signal being the physical signal in an initial step; the signal being sampled at a number of time values;
determining a number of midpoints; each mipoints being between consecutive maxima and minima;
obtaining a spline curve connecting the midpoints;
obtaining, at each time value from the number of time values, a component value by subtracting a signal value from a spline curve value; and
recursively performing a sifting step until successive component signal values are substantially equal; wherein a signal comprising the component values of a resulting recursive sifting is the intrinsic mode function;

wherein the physical signal is a one-dimensional physical signal.

17. The computer program product of claim 16 wherein, the computer readable code, in causing the one or more processors to obtain the intrinsic mode function, also causes the one or more processors to:
  obtain one or more other intrinsic mode functions by:
    (a) obtaining a signal equal to a difference between the physical signal and a sum of previously obtained intrinsic mode functions;
    (b) obtaining another intrinsic mode function utilizing the computer readable code as in claim 10 that causes the one or more processors to obtain the intrinsic mode function; and
    (c) repeating steps (a) and (b) until a predetermined criterion is met.

18. The computer program product of claim 17 wherein the predetermined criterion comprises a standard deviation between consecutively obtained sums of intrinsic mode functions being at most a predetermined value,

* * * * *